(12) United States Patent
Link et al.

(10) Patent No.: US 12,093,599 B2
(45) Date of Patent: Sep. 17, 2024

(54) SYSTEMS AND METHODS FOR PROVIDING A SERVER-SIDE-GENERATED PREVIEW STREAM FOR A USER OF A VIDEO CONFERENCING SERVICE

(71) Applicant: Capital One Services, LLC, McLean, VA (US)

(72) Inventors: Alexander Link, Arlington, VA (US); Geeta Shyamala, Herndon, VA (US); Benjamin Polk, Arlington, VA (US); Lee Adcock, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 205 days.

(21) Appl. No.: 17/822,163

(22) Filed: Aug. 25, 2022

(65) Prior Publication Data

US 2024/0069851 A1  Feb. 29, 2024

(51) Int. Cl.
*G06F 3/14* (2006.01)
*H04L 65/1096* (2022.01)

(52) U.S. Cl.
CPC ........ *G06F 3/1462* (2013.01); *H04L 65/1096* (2013.01)

(58) Field of Classification Search
CPC ............................ G06F 3/1462; H04L 65/1096
USPC ...................................................... 348/14.08
See application file for complete search history.

(56) References Cited

U.S. PATENT DOCUMENTS

| | | | |
|---|---|---|---|
| 11,700,223 B2 * | 7/2023 | Niess | H04L 51/216 709/206 |
| 11,765,215 B2 * | 9/2023 | Agrawal | H04L 65/60 348/14.08 |
| 11,882,381 B2 * | 1/2024 | Maini | H04L 12/1822 |
| 2010/0199187 A1 * | 8/2010 | Lin | H04L 67/1095 709/204 |
| 2016/0313969 A1 * | 10/2016 | Ayabe | G06F 3/16 |
| 2018/0191993 A1 * | 7/2018 | Gera | H04N 23/65 |
| 2020/0296147 A1 * | 9/2020 | Eliason | H04L 65/403 |
| 2022/0150416 A1 * | 5/2022 | Wang | H04N 23/64 |
| 2022/0248187 A1 * | 8/2022 | Reese | H04L 51/046 |
| 2022/0368743 A1 * | 11/2022 | Miller | H04L 65/611 |
| 2023/0273720 A1 * | 8/2023 | Silverstein | H04L 65/4015 715/753 |

* cited by examiner

*Primary Examiner* — Binh Kien Tieu
(74) *Attorney, Agent, or Firm* — Foley & Lardner LLP

(57) ABSTRACT

Systems and methods for generating a preview stream for a user of a video conferencing service. In some aspects, the systems and methods provide for receiving a video stream of at least a portion of a display screen of a user device and determining whether the user device has been designated as a receiving device for receiving a version of the video stream. In response to determining that the user device has not been designated as a receiving device for receiving a version of the video stream, a request is generated to designate the user device as a receiving device in addition to being a presenting device. Based on images of the video stream, a preview stream (e.g., of at least a portion of the display screen) is generated and transmitted for display at the user device.

20 Claims, 5 Drawing Sheets

SYSTEMS AND METHODS FOR PROVIDING A SERVER-SIDE-GENERATED PREVIEW STREAM FOR A USER OF A VIDEO CONFERENCING SERVICE

BACKGROUND

While video conferencing services have offered video sharing capabilities for several years, day-to-day use of such video conferencing services has increased exponentially since the COVID-19 pandemic began. It is now commonplace to have meetings in which a worker shares their display screen or monitor for other meeting participants to view on their devices. Further, the worker may have multiple display screens for facilitating their day-to-day work because having more than one display screen may allow for multiple documents or applications to be open and visible at the same time. For example, the worker may have an email application open in one display screen while working on a presentation opened in another display screen. When using the video conferencing service to share their display screen during a meeting, the worker may face technical difficulties such as when what the worker intended to share is not what is delivered via the video conferencing service to other meeting participants.

SUMMARY

Systems and methods are described herein for generating a preview stream for a user of a video or other communication service. When using a video conferencing service to share some or all of their display screen during a meeting, a user may not receive any feedback or confirmation regarding what is being shared to other users of the video conferencing service. For example, the user may have more than one display screen and may inadvertently share a display screen different from the display screen they intended to share. In another example, the user may have intended to share a particular window on their display screen but may inadvertently share a different window or the whole display screen, or an entirely different display screen. In yet another example, the user may have selected the correct window or display screen to share with other users but may be unaware that the other users are not receiving the video stream in a timely manner due to upload bandwidth issues on the user's system or another technical issue. The user may be discussing a particular point shown on a presentation on their display screen, but the other users may not yet have received the video stream containing that portion of the display screen. In each of these examples, a lack of feedback or confirmation to the user regarding what is being shared to other users may lead to unnecessary ambiguity and slow the flow of such meetings.

Conventionally, because video conferencing services are not configured to show the user what is being shared (e.g., what is actually being transmitted from the server to the other user devices) when presenting some or all of the user's screen to other users, the user does not receive any feedback or confirmation regarding what is being shared from their display screen to other users. For example, while a server for a conventional video conferencing service may receive a video stream containing images of a portion of the user's display screen and relay the video stream to other users of the video conferencing service, the server is not configured to generate the preview stream to send back to the user's device.

In some embodiments, to address one or more of the foregoing technical problems, a server for a video conferencing service is configured to send to a presenting user device a preview stream based on a video stream of a display screen received at the server. The presenting user device may share some or all of the display screen to the video conferencing service. For example, a user may share a window or a display screen from the presenting user device to the video conferencing service. The server may receive the video stream of a portion of the display screen from the presenting user device. The server may receive, from the presenting user device, an indication that the user has requested a preview stream of the portion of the display screen being shared by the user. For example, the user may request at the time of presenting their display screen (or at a prior time, via an application setting for the video conferencing service, etc.) to receive a preview stream of what is being shared from their display screen. The user may use this preview stream to confirm that what is being shared to other users of the video conferencing service is what the user intended to share.

Based on the indication that the user has requested a preview stream, the server may determine whether the presenting user device is designated as a screenshare receiving device for receiving a version of the video stream. The presenting user device is already designated as a presenting device when the portion of the display screen is being shared. If the server determines that the presenting user device is not designated as a screenshare receiving device, the server may generate a request to designate the presenting user device as a screenshare receiving device in addition to being a presenting device. For example, the user may request at the time of presenting their display screen to receive a preview stream of what is being shared from their display screen. The user may have previously not used this feature or may have turned it off. Otherwise, the presenting user device may already be designated as a screenshare receiving device in addition to being a presenting device.

Subsequently, based on images of the video stream from the presenting user device, the server may generate the preview stream of the portion of the display screen being shared by the user. The server may transmit the preview stream to the presenting user device. Additionally, the server may transmit video streams of other users of the video conferencing service for display to the user. Finally, the presenting user device may simultaneously display both the portion of the display screen and the preview stream while sharing the portion of the display screen. For example, the user may view the display screen as well as a preview of the portion of the display screen being shared in a window in the bottom right-hand corner or another suitable location on the display screen.

In some embodiments, the server may generate a preview stream that is a version of the video stream from the presenting user device that requires less bandwidth when being transmitted to the presenting user device. The version of the video stream that is transmitted as the preview stream may have a reduced frame rate or a lower resolution than the video stream received at the server. In this way, for example, the bandwidth required to transmit the preview stream to the presenting user device may be reduced while simultaneously providing the benefit of the preview stream to the user.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

As referred to herein, a "video conferencing service" may include technologies for reception and transmission of audio-video streams by users in different locations, for communication between the users in real time or near real time. As referred to herein, a "user interface" may comprise a human-computer interaction and communication in a device and may include display screens, keyboards, a mouse, and the appearance of a desktop. For example, a user interface may comprise a way a user interacts with an application or a website. As referred to herein, "video stream" may comprise a media asset including one or more images and optionally associated audio. For example, a video stream of a portion of a display screen of a user device may include images of the portion of the display screen.

Figure 1:
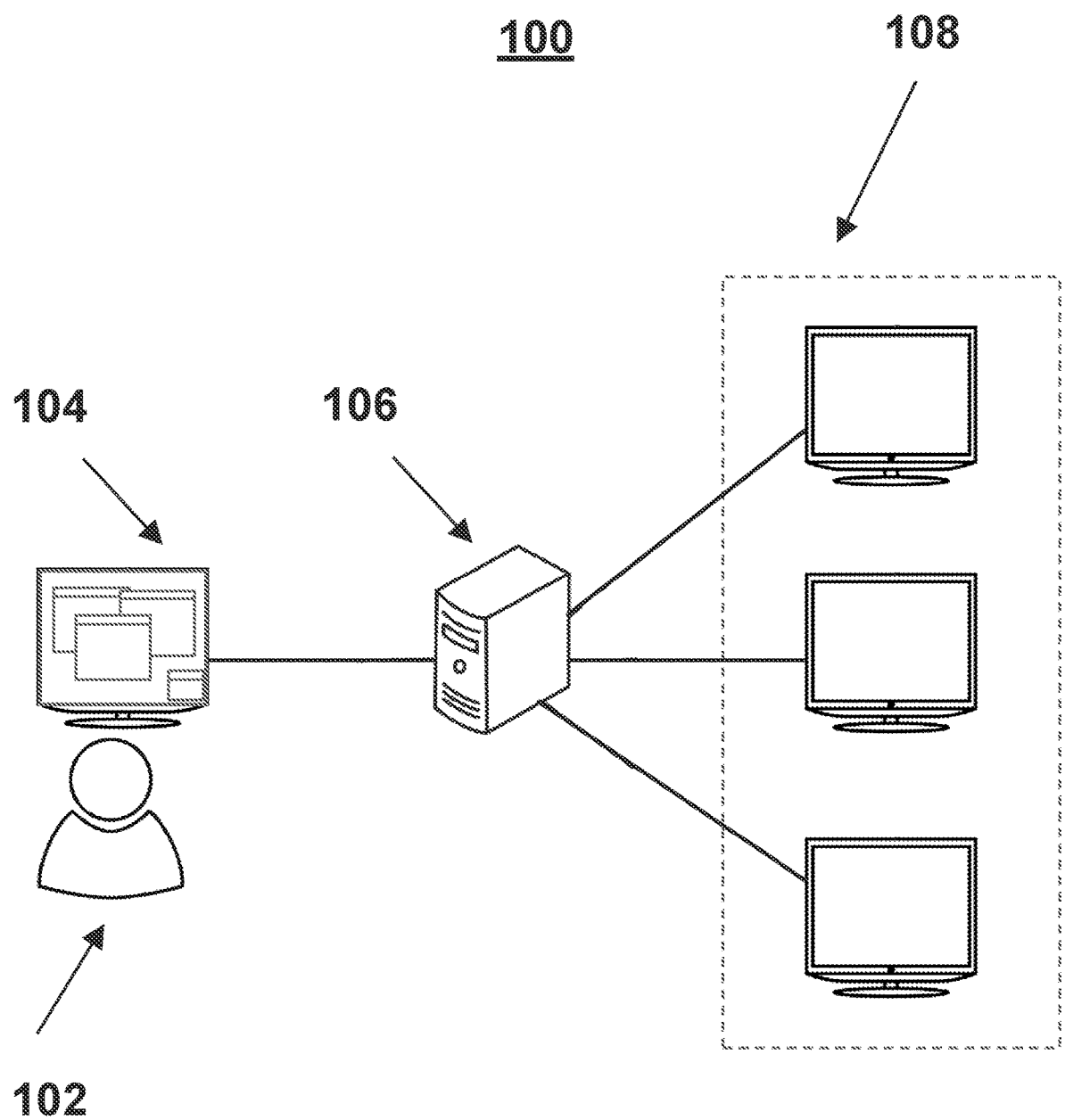
FIG. 1 is an illustrative system for facilitating a communication service, in accordance with one or more embodiments.

FIG. 1 is an illustrative system 100 for facilitating a communication service (e.g., a video conference service or other communication service), in accordance with one or more embodiments. For example, FIG. 1 shows a user device 104 for a user 102 sharing a portion of their display screen (or other content) via server 106 (or servers 106) to user devices 108 for other users of the video conferencing service. For example, user 102 may share at least a portion of a display screen, such as a window, the entire display screen, or another suitable portion thereof, from the presenting user device (e.g., user device 104) to a server (e.g., server 106) for the video conferencing service. Server 106 for the video conferencing service may receive a video stream of the portion of the display screen (or other content) shared from user device 104. Server 106 may transmit the video stream (or a version of the video stream optimized for delivery to other user devices, such as in a suitable format, etc.) to user devices 108 for other users of the video conferencing service. In some embodiments, a server-side-generated preview of the video stream may be transmitted by server 106 to the presenting user device (e.g., user device 104).

In some embodiments, where user 102 wants to receive feedback or confirmation regarding what is being shared to other users (e.g., what is being transmitted from server 106 to the other user devices), server 106 may receive, from user device 104, an indication that user 102 has requested a preview stream of the portion of the display screen being shared by user 102. For example, user 102 may request at the time of presenting their display screen (or at a prior time, via an application setting for the video conferencing service, etc.) to receive a preview stream of what is being shared from their display screen. User 102 may use this preview stream to confirm that what is being shared to other users of the video conferencing service is what the user intended to share.

Server 106 may determine whether user device 104 is designated as a screenshare receiving device (or a receiving device) for receiving a version of the video stream. While user device 104 is already designated as a presenting device when the portion of the display screen is being shared, user device 104 may not be designated as a screenshare receiving device. If server 106 determines that user device 104 is not designated as a screenshare receiving device, server 106 may generate a request to designate user device 104 as a screenshare receiving device in addition to being a presenting device. Additionally or alternatively, the determination regarding the screenshare receiving designation or the request to designate user device 104 as a screenshare receiving device may be generated at user device 104.

User 102 may receive feedback or confirmation regarding what is being shared to other users via a preview stream generated at server 106, at user device 104, or at another suitable location. The preview stream of the portion of the display screen being shared by user 102 may be generated based on images of the video stream from user device 104. In some embodiments, server 106 may transmit the preview stream to user device 104. User device 104 may simultaneously display both the portion of the display screen and the preview stream while sharing the portion of the display screen. For example, user 102 may view the display screen as well as a preview of the portion of the display screen being shared in a window in the bottom right-hand corner or another suitable location on the display screen. Additionally or alternatively, server 106 may transmit to user device 104 video streams of other users of the video conferencing service for display to user 102.

In some embodiments, server 106 may generate a preview stream that is a version of the video stream from user device 104 that requires less bandwidth when being transmitted to user device 104. The version of the video stream that is transmitted as the preview stream may have a reduced frame rate or a lower resolution than the video stream received at server 106. This may help reduce the bandwidth required to transmit the preview stream to user device 104 while simultaneously providing the benefit of the preview stream to user 102.

Figure 2:
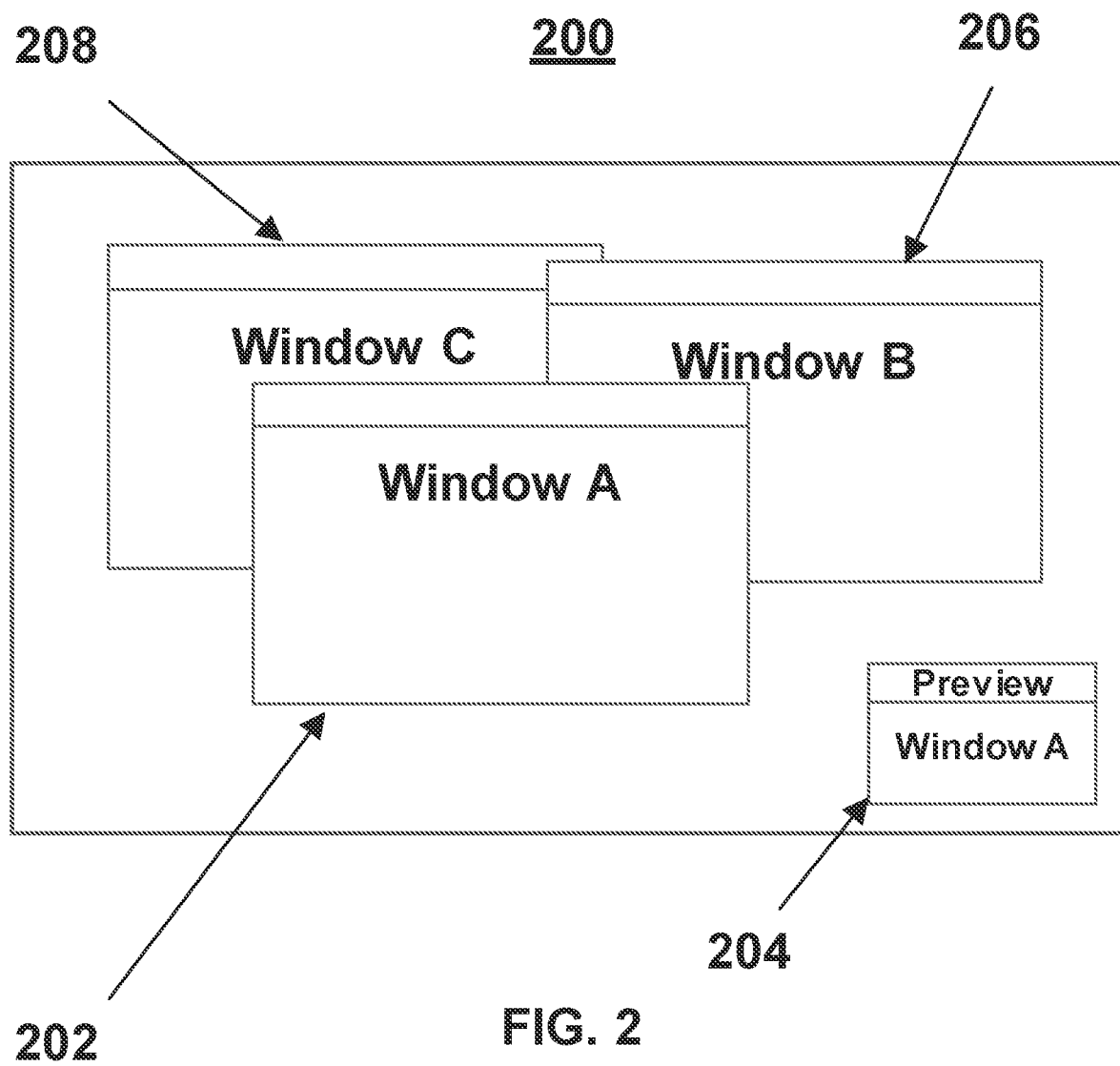
FIG. 2 shows an illustrative user interface for a user device simultaneously displaying both a portion of a display screen and a preview stream while sharing the portion of the display screen, in accordance with one or more embodiments.

FIG. 2 shows an illustrative user interface for a user device simultaneously displaying both a portion of a display screen and a preview stream while sharing the portion of the display screen, in accordance with one or more embodiments. User interface 200 may be generated for display on user device 104 or another suitable user device. In this example, the user (e.g., user 102) may select to share window 202 ("Window A") to other users of the video conferencing service. The user may receive preview stream 204, which provides feedback to the user regarding what is being shared from the user device. In another example, if the user inadvertently selects window 202 for sharing but intended to share window 206 ("Window B") or window 208 ("Window C"), the user may quickly notice via preview stream 204 that the wrong window is being shared and correct the error. This may help improve the flow of the meeting without any need for one of the other users in the meeting to point out to the user that the incorrect window was being shared.

In another example, the user may have more than one display screen and may inadvertently share a display screen that is different from the display screen they intended to share. The user may similarly receive a preview stream and quickly notice that the wrong display screen has been shared. The user may correct the error and select the correct display screen for sharing with other users of the video conferencing service. In yet another example, the user may have selected the correct window or display screen to share with other users but may be unaware that the other users are not receiving the video stream in a timely manner due to upload bandwidth issues on the user's system or another technical issue. The user may be discussing a particular point shown on a presentation on their display screen, but the other users may not yet have received the video stream containing that portion of the display screen. The user may notice via preview stream 204 that what is being shown on their display screen does not match what is being shown in the preview stream (and is being shared with the other users). This may give the user an opportunity to correct the error (e.g., by moving to a different location to get a stronger Wi-Fi signal, turning off the video stream from their webcam to reduce upload bandwidth usage, etc.) or ask for technical assistance to rectify the error.

Figure 3A:
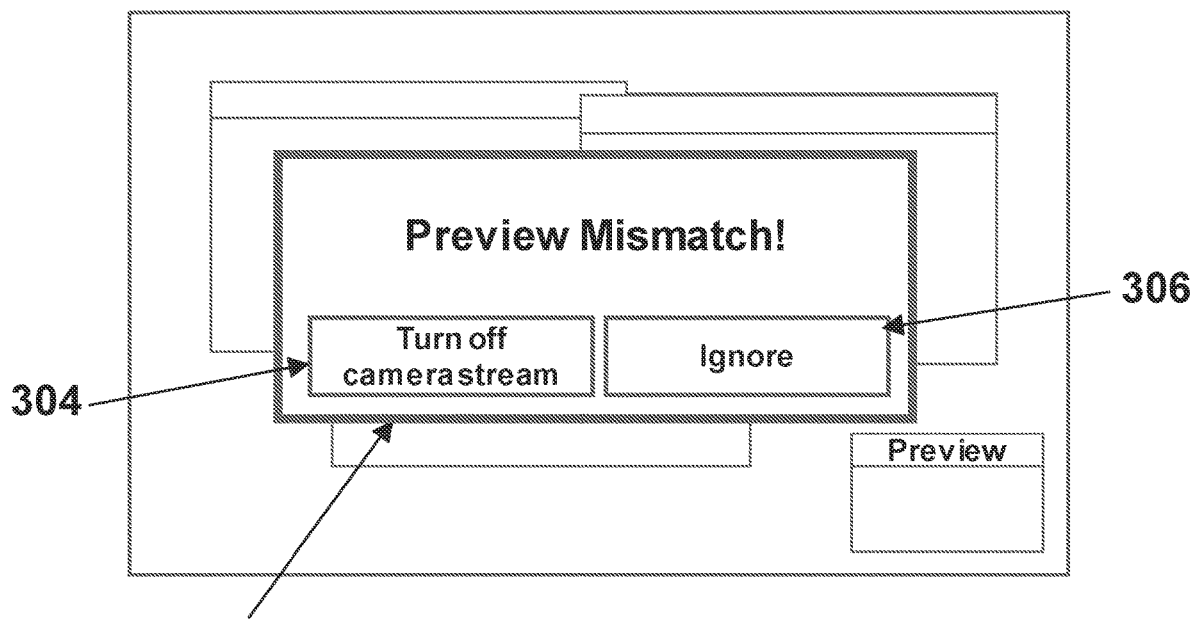
FIGS. 3A-3B show illustrative user interfaces for a user device analyzing a preview stream and requesting input from the user, in accordance with one or more embodiments.
Figure 3B:
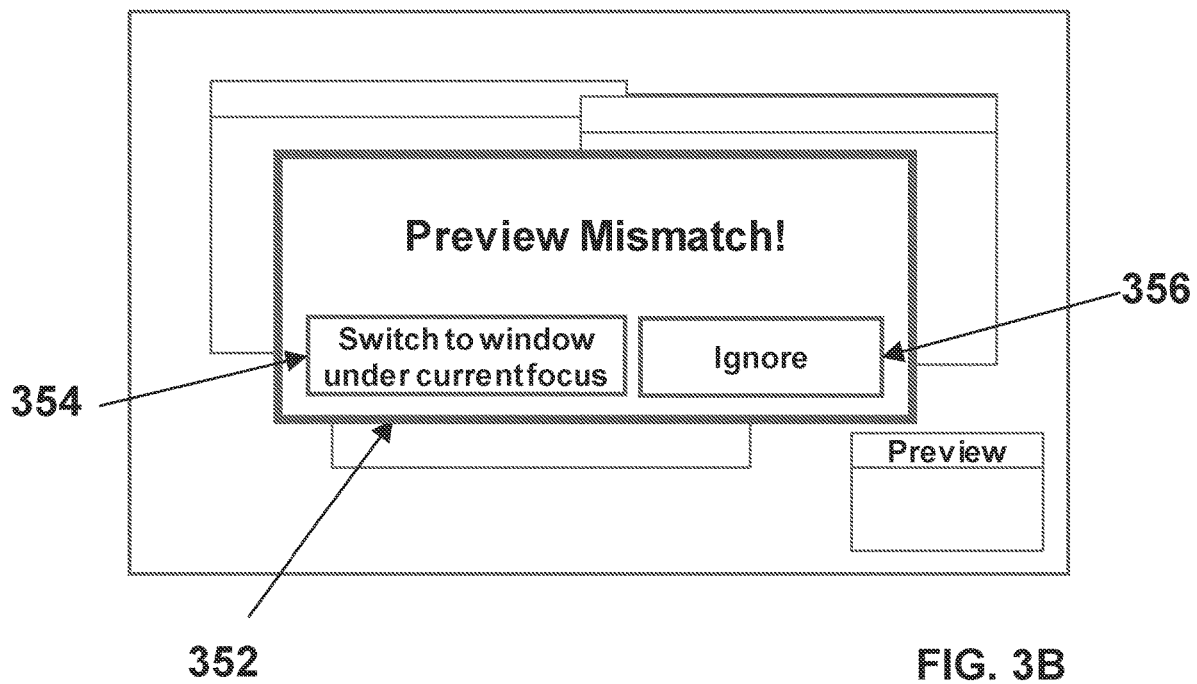

FIGS. 3A-3B show illustrative user interfaces for a user device analyzing a preview stream and requesting input from the user, in accordance with one or more embodiments. The user device may be configured to analyze the portion of the display screen being shared to other users of the video conferencing service (e.g., the video stream) and the preview stream obtained from the server (or generated locally or at another suitable location). If the user device determines that there is a mismatch between the portion of the display screen being shared and what is being received in the preview stream, the user device may generate an error notification for the user. The user device may ask the user for input to assist in correcting the error. Additionally or alternatively, the user device may automatically correct the error either before or after showing the error notification to the user or entirely forgo the error notification to streamline the user experience. Additionally or alternatively, the user device may generate a pop-up notification or "flash" an outline of the preview stream (e.g., alternately change the color of the outline of the preview stream) or otherwise generate a more subtle notification that does not block the user's view of the display screen or does not require the user to provide input.

In some embodiments, the user device may determine that the preview stream does not match the video stream being transmitted to other users of the video conferencing service by comparing one or more time-stamped images from the preview stream and the video stream. Additionally or alternatively, the user device may use an artificial intelligence model (e.g., a model as described with respect to FIG. 4) to determine whether there is a mismatch between the video stream and the preview stream. The model may receive as input the video stream and the preview stream and generate a prediction regarding whether there is a mismatch or not (e.g., a probability or a binary classification or another suitable indication). Additionally or alternatively, the user device may store a history of which display screen, window, application, etc., the user selects for sharing over a period of time. The user device may provide this history to the model to help determine whether there is a mismatch. For example, the user may typically select a first display screen of two display screens for sharing, but in an instance where the second display screen of the two display screens is selected for sharing, it may be an indication that the user inadvertently selected the second display screen for sharing with other users of the video conferencing service. In another example, if the display screen selected by the user simply shows the default desktop background, or a blank window, it may be an indication that the user inadvertently selected this for sharing and likely meant to share something else.

In some embodiments, the user device may help streamline the meeting experience by automatically entering a message in a chat session for the meeting, such as "can you see my screen?" The other users may provide input to the user, and this may be helpful to the user to determine whether the correct portion of the display screen has been selected and is being received by the other users of the video conferencing service. Additionally or alternatively, the user device may take snapshots of the portion of the display screen being shared and enter them as messages in the chat session, thereby creating a history of what is being shared with the other users. The user may be able to view this history in the chat session during the meeting or after the meeting is over to review what portion of the display screen was being shared as the meeting progressed over time.

FIG. 3A shows user interface 300 generated for display on user device 104 or another suitable user device. In this example, the user device may determine that there is a mismatch between the video stream and the preview stream. The user device may further determine that the upload bandwidth of the user device is insufficient to stream both the video stream of what is being shared from the user device and the video stream from the user's webcam (e.g., showing the user's face, surroundings, etc.). The user device may generate notification 302 to inform the user of the mismatch. Notification 302 may further include options 304 and 306. If the user selects option 304 ("Turn off camera stream"), the video stream from the user's webcam may be turned off to reduce usage of the upload bandwidth. If the user selects option 306 ("Ignore"), the user device may remove notification 302 without taking further action itself. For example, the user may move to a different location to get a stronger Wi-Fi signal or otherwise take action to correct the issue. If, after a period of time, the mismatch persists due to insufficient upload bandwidth, the user device may again display notification 302. Additionally or alternatively, the user device may generate a pop-up notification or "flash" an outline of the preview stream (e.g., alternately change the color of the outline of the preview stream) or otherwise generate a more subtle notification that does not block the user's view of the display screen or does not require the user to provide input.

FIG. 3B shows user interface 350 generated for display on user device 104 or another suitable user device. In this example, the user device may determine that the portion of the display screen in the preview stream does not match a current portion of the display screen where the user is focusing, using an input device (e.g., a mouse, a stylus, etc.). This may be the case because the user intended to share a different portion of the display screen (or a different window or an entirely different display screen) to other users of the video conferencing service. The user device may generate notification 352 to inform the user of the mismatch. Notification 352 may further include options 354 and 356. If the user selects option 354 ("Switch to window under current focus"), the portion of the display screen being shared may be switched to the current portion where the user is focusing, using the input device. If the user selects option 356 ("Ignore"), the user device may remove notification 352 without taking further action. For example, the user may have temporarily focused on a different portion of the display screen and did not want to share that portion of the display screen to the other users of the video conferencing service. If, after a period of time, the mismatch persists due to continued focus on a different portion of the display screen than the portion being currently shared, the user device may again display notification 352. Additionally or alternatively, the user device may generate a pop-up notification or "flash" an outline of the preview stream (e.g., alternately change the color of the outline of the preview stream) or otherwise generate a more subtle notification that does not block the user's view of the display screen or does not require the user to provide input.

In some embodiments, the user device may use an artificial intelligence model (e.g., a model as described with respect to FIG. 4) to determine whether there is a mismatch between the video stream and the preview stream. The model may receive as input the video stream and the preview stream and generate a prediction regarding whether there is a mismatch or not (e.g., a probability or a binary classification or another suitable indication).

Figure 4:
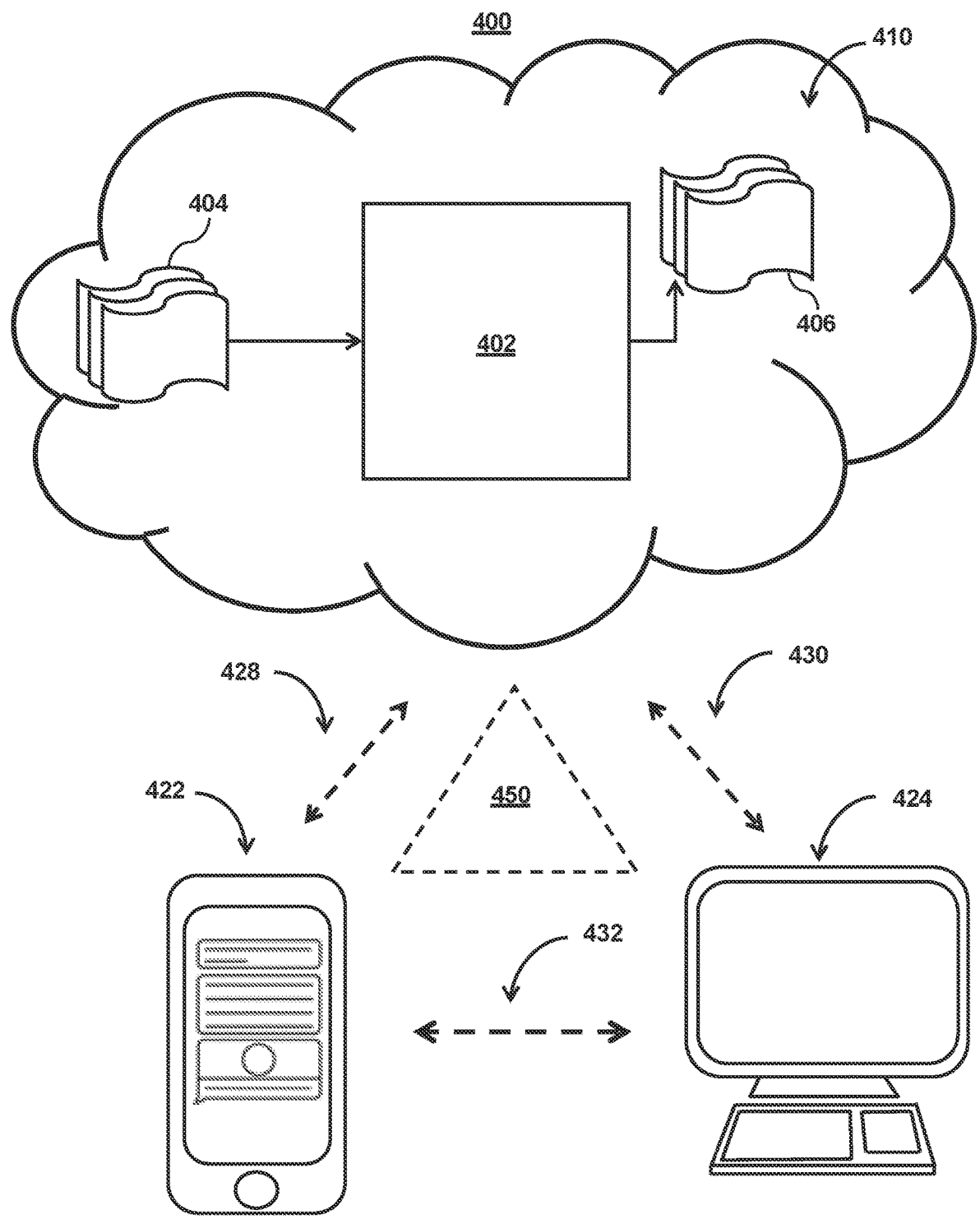
FIG. 4 is an illustrative architecture for a video conferencing system, in accordance with one or more embodiments.

FIG. 4 is an illustrative architecture for a video conferencing system in accordance with one or more embodiments. As shown in FIG. 4, system 400 may include mobile device 422 and user terminal 424 (either type of device may be a "user device" as referred to herein, though a user device may additionally or alternatively include other types of devices as well). While shown as a smartphone and a personal computer, respectively, in FIG. 4, it should be noted that mobile device 422 and user terminal 424 may be any computing device, including, but not limited to, a laptop computer, a tablet computer, a hand-held computer, or other computer equipment (e.g., a server), including "smart," wireless, wearable, and/or mobile devices. FIG. 4 also includes cloud components 410. Cloud components 410 may alternatively be any computing device as described above and may include any type of mobile terminal, fixed terminal, or other device. For example, cloud components 410 may be implemented as a cloud computing system and may feature one or more component devices. It should also be noted that system 400 is not limited to three devices. Users, may, for instance, utilize one or more devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of mobile device 422, those operations may, in some embodiments, be performed by components of cloud components 410. In some embodiments, the various computers and systems described herein may include one or more computing devices that are programmed to perform the described functions. Additionally or alternatively, multiple users may interact with system 400 and/or one or more components of system 400. For example, in one embodiment, a first user and a second user may interact with system 400 using two different components.

With respect to the components of mobile device 422, user terminal 424, and cloud components 410, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 4, both mobile device 422 and user terminal 424 include a display upon which to display data (e.g., based on video streams received from system 400).

Additionally, as mobile device 422 is shown as a touch-screen smartphone, this display also acts as a user input interface. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 400 may run an application (or another suitable program). The application may cause the processors and/or control circuitry to perform operations related to generating dynamic database query responses using ensemble prediction by correlating probability models with non-homogenous time dependencies to generate time-specific data processing predictions.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communication networks or combinations of communication networks. Communication paths 428, 430, and 432 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may include a server 402 for a video conferencing system. For example, server 402 may receive a video stream 404 from mobile device 422 and transmit a version of the video stream 406 to user terminal 424. In another example, server 402 may receive video stream 404 from user terminal 424 and transmit the version of the video stream 406 back to user terminal 424. Server 402 may reduce a frame rate or a resolution of the video stream 404 to generate the version of the video stream 406 to be transmitted to user terminal 424. Cloud components 410 may also include control circuitry configured to perform the various operations needed to generate a preview stream for a user of the video conferencing system according to one or more embodiments.

In some embodiments, cloud components 410 include an artificial intelligence model. The artificial intelligence model may take inputs and provide outputs. The inputs may include multiple datasets, such as a training dataset and a test dataset. Each of the multiple datasets may include data subsets related to video streams of portions of display screens typically shared by the user. In some embodiments, the outputs may be fed back to the artificial intelligence model as input to train the artificial intelligence model (e.g., alone or in conjunction with user indications of the accuracy of the outputs, with labels associated with the inputs, or with other reference feedback information). For example, the system may receive a first labeled feature input, wherein the first labeled feature input is labeled with a known prediction for the first labeled feature input. The system may then train the artificial intelligence model to classify the first labeled feature input with the known prediction.

In another embodiment, the artificial intelligence model may update its configurations (e.g., weights, biases, or other parameters) based on the assessment of its prediction and reference feedback information (e.g., user indication of accuracy, reference labels, or other information). In another embodiment, where the artificial intelligence model is a neural network, connection weights may be adjusted to reconcile differences between the neural network's prediction and the reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the artificial intelligence model may be trained to generate better predictions.

In some embodiments, the artificial intelligence model may include an artificial neural network. In such embodiments, the artificial intelligence model may include an input layer and one or more hidden layers. Each neural unit of the artificial intelligence model may be connected with many other neural units of the artificial intelligence model. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function that the signal must surpass before it propagates to other neural units. The artificial intelligence model may be self-learning and trained, rather than explicitly programmed, and can perform significantly better in certain areas of problem solving as compared to traditional computer programs. During training, an output layer of the artificial intelligence model may correspond to a classification of the artificial intelligence model, and an input known to correspond to that classification may be input into an input layer of the artificial intelligence model during training. During testing, an input without a known classification may be input into the input layer, and a determined classification may be output.

In some embodiments, the artificial intelligence model may include multiple layers (e.g., where a signal path traverses from front layers to back layers). In some embodiments, backpropagation techniques may be utilized by the artificial intelligence model where forward stimulation is used to reset weights on the "front" neural units. In some embodiments, stimulation and inhibition for the artificial intelligence model may be more free-flowing, with connections interacting in a more chaotic and complex fashion. During testing, an output layer of the artificial intelligence model may indicate whether or not a given input corresponds to a classification of the artificial intelligence model.

System 400 also includes application programming interface (API) layer 450. API layer 450 may allow the system to communicate across different devices. In some embodiments, API layer 450 may be implemented on mobile device 422 or user terminal 424. Alternatively or additionally, API layer 450 may reside on one or more of cloud components 410. API layer 450 (which may be a REST or Web services API layer) may provide a decoupled interface to data and/or functionality of one or more applications. API layer 450 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 450 may use various architectural arrangements. For example, system 100 may be partially based on API layer 450, such that there is strong adoption of SOAP and RESTful Web services, using resources like Service Repository and Developer Portal, but with low governance, standardization, and separation of concerns. Alternatively, system 100 may be fully based on API layer 450, such that separation of concerns between layers like API layer 450, services, and applications are in place.

In some embodiments, the system architecture may use a microservice approach. Such systems may use two types of layers: Front-End Layer and Back-End Layer, where microservices reside. In this kind of architecture, the role of the API layer 450 may provide integration between the Front-End Layer and the Back-End Layer. In such cases, API layer 450 may use RESTful APIs (exposition to front-end or even communication between microservices). API layer 450 may use AMQP (e.g., Kafka, RabbitMQ, etc.). API layer 450 may use incipient usage of new communication protocols such as gRPC, Thrift, etc.

In some embodiments, the system architecture may use an open API approach. In such cases, API layer 450 may use commercial or open-source API platforms and their modules. API layer 450 may use a developer portal. API layer 450 may use strong security constraints applying WAF and DDoS protection, and API layer 450 may use RESTful APIs as standard for external integration.

Figure 5:
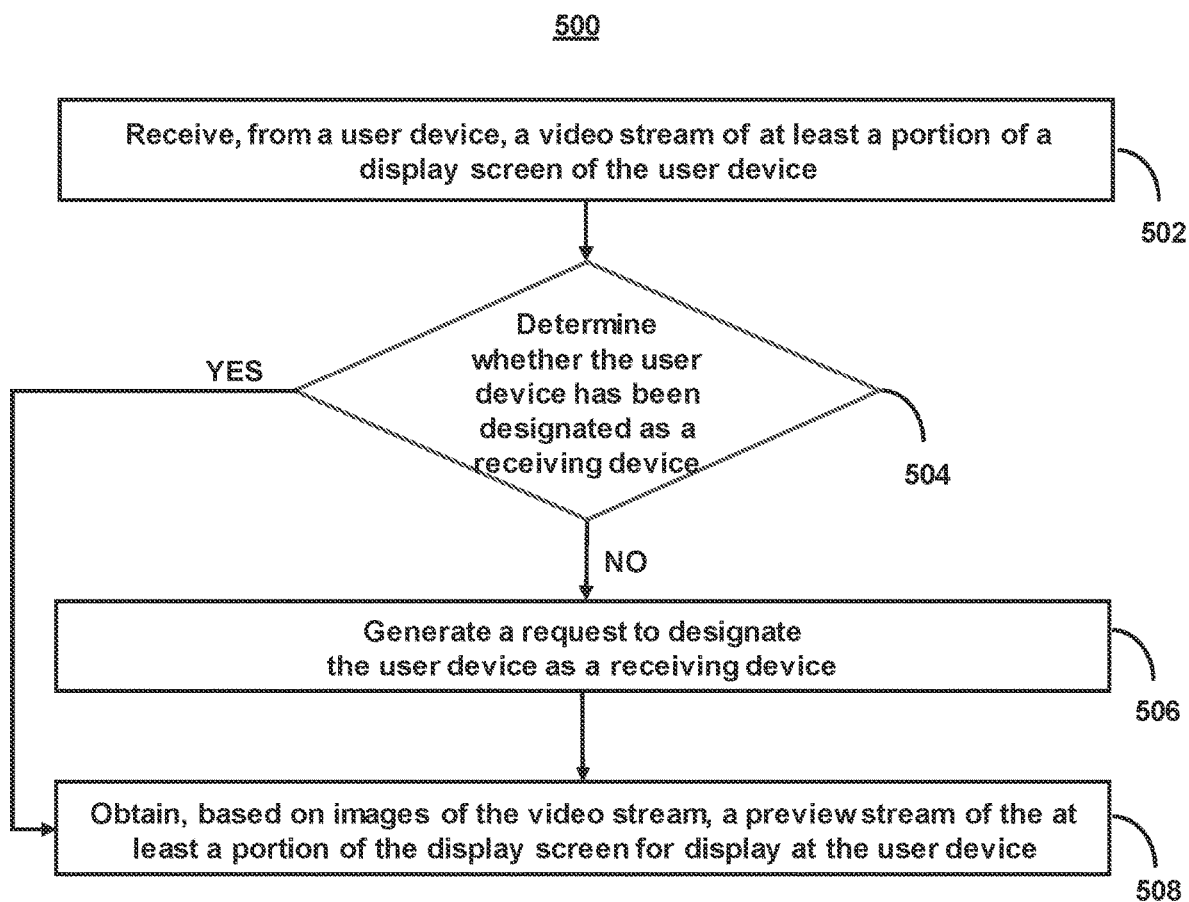
FIG. 5 shows a flowchart of the steps involved in generating a preview stream for a user of a video conferencing service, in accordance with one or more embodiments.

FIG. 5 shows a flowchart of the steps involved in generating a preview stream for a user of a video conferencing service, in accordance with one or more embodiments. For example, process 500 may represent the steps taken by one or more devices as shown in FIGS. 1-4.

At step 502, process 500 (e.g., using one or more components in system 400 (FIG. 4)) receives, from a user device connected to a video conferencing service, a video stream of at least a portion of a display screen of the user device. For example, a user (e.g., user 102) may share at least a portion of a display screen of the user device (e.g., user device 104), such as a window, the entire display screen, or another suitable portion thereof, from the user device to the video conferencing service. A server (e.g., server 106) for the video conferencing service may receive a video stream of the portion of the display screen shared from the user device.

In some embodiments, the server (e.g., server 106) may receive, from the user device (e.g., user device 104), an indication that the user (e.g., user 102) has requested a preview stream of the portion of the display screen being shared by the user. For example, the user may request at the time of presenting their display screen (or at a prior time, via an application setting for the video conferencing service, etc.) to receive a preview stream of what is being shared from their display screen.

At step 504, process 500 (e.g., using one or more components in system 400 (FIG. 4)) determines whether the user device has been designated as a receiving device for receiving a version of the video stream. The user device may already be designated as a presenting device when the at least a portion of the display screen is being shared. For example, the server (e.g., server 106) may determine whether the user device (e.g., user device 104) is designated as a screenshare receiving device for receiving a version of the video stream.

At step 506, process 500 (e.g., using one or more components in system 400 (FIG. 4)), in response to determining that the user device has not been designated as a receiving device for receiving a version of the video stream, generates a request to designate the user device as a receiving device in addition to being a presenting device. For example, while the user device (e.g., user device 104) may already be designated as a presenting device when the portion of the display screen is being shared, the user device may not be designated as a screenshare receiving device. If the server (e.g., server 106) determines that the user device is not designated as a screenshare receiving device, the server may generate a request to designate the user device as a screenshare receiving device in addition to being a presenting device. Additionally or alternatively, the determination regarding the screenshare receiving designation or the request to designate the user device as a screenshare receiving device may be generated at the user device.

At step 508, process 500 (e.g., using one or more components in system 400 (FIG. 4)) obtains, based on images of the video stream, a preview stream of the at least a portion of the display screen for display at the user device, the user device simultaneously displaying both the portion of the display screen and the preview stream while sharing the portion of the display screen. For example, the preview stream of the portion of the display screen being shared by the user (e.g., user 102) may be generated based on images of the video stream from the user device (e.g., user device 104). The user may receive feedback or confirmation regarding what is being shared to other users via a preview stream generated at the server (e.g., server 106), at the user device, or at another suitable location.

In some embodiments, process 500 (e.g., using one or more components in system 400 (FIG. 4)) reduces a frame rate or a resolution of the video stream of the at least a portion of the display screen to generate the preview stream. For example, the server (e.g., server 106) may generate a preview stream that is a version of the video stream from the user device (e.g., user device 104) that requires less bandwidth when being transmitted to the user device. The version of the video stream that is transmitted as the preview stream may have a reduced frame rate or a lower resolution than the video stream received at the server. This may help reduce the bandwidth required to transmit the preview stream to the user device while simultaneously providing the benefit of the preview stream to the user (e.g., user 102).

In some embodiments, process 500 (e.g., using one or more components in system 400 (FIG. 4)) determines that the preview stream does not match the video stream being transmitted to a second user device, and in response to the determining, generates a notification for display to a user. For example, process 500 may receive, from a server, the video stream being transmitted to the second user device, compare one or more time-stamped images from the preview stream and the video stream, and determine that the preview stream does not match the video stream based on the comparison. The user device (e.g., user device 104) may generate a notification (e.g., notification 302) to inform the user of the mismatch.

In some embodiments, process 500 (e.g., using one or more components in system 400 (FIG. 4)) determines that an upload bandwidth of the first user device does not satisfy a threshold, and in response to the determining, generates for display to the user an option to turn off transmitting a video stream of the user from a camera of the first user device. For example, a notification (e.g., notification 302) displayed to the user may include options to "Turn off camera stream" (e.g., option 304) or "Ignore" (e.g., option 306). If the user selects the option to "Turn off camera stream," the video stream from the user's webcam may be turned off to reduce usage of the upload bandwidth. If the user selects the option to "Ignore," the user device may remove the notification without taking further action.

In some embodiments, process 500 (e.g., using one or more components in system 400 (FIG. 4)) determines that the at least a portion of the display screen included in the preview stream does not match a current portion of the display screen where a user is focusing, using an input device, and in response to the determining, generates a notification for display to the user. For example, the user device (e.g., user device 104) may determine that the portion of the display screen in the preview stream does not match a current portion of the display screen where the user is focusing, using an input device (e.g., a mouse, a stylus, etc.). This may be the case because the user intended to share a different portion of the display screen (or a different window or an entirely different display screen) to other users of the video conferencing service. The user device may generate a notification (e.g., notification 352) to inform the user of the mismatch.

In some embodiments, process 500 (e.g., using one or more components in system 400 (FIG. 4)) generates for display to the user an option to switch sharing to the current portion of the display screen where the user is focusing, using the input device. For example, a notification (e.g., notification 352) displayed to the user may include options "Switch to window under current focus" (e.g., option 354) or "Ignore" (e.g., option 356). If the user selects the option to "Switch to window under current focus," the portion of the display screen being shared may be switched to the current portion where the user is focusing, using the input device. If the user selects the option to "Ignore," the user device may remove the notification without taking further action.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-4 could be used to perform one or more of the steps in FIG. 5.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving, from a presenting user device connected to a video conferencing service, a video stream of a portion of a display screen being shared by a user of the video conferencing service; receiving, from the presenting user device, an indication that the user has requested a preview stream of the portion of the display screen being shared by the user; based on the indication, determining whether the presenting user device is designated as a screenshare receiving device for receiving a version of the video stream, wherein the presenting user device is designated as a presenting device when the portion of the display screen is being shared; in response to determining that the presenting user device is not designated as a screenshare receiving device, generating a request to designate the presenting user device as a screenshare receiving device in addition to being a presenting device; generating, based on images of the video stream from the presenting user device, the preview stream of the portion of the display screen being shared by the user; and transmitting, to the presenting user device, the preview stream and one or more video streams of other users of the video conferencing service for display to the user, the presenting user device simultaneously displaying both the portion of the display screen and the preview stream while sharing the portion of the display screen.

2. A method comprising: receiving, from a first user device connected to a video conferencing service, a video stream of at least a portion of a display screen of the first user device; determining whether the first user device has been designated as a receiving device for receiving a version of the video stream, wherein the first user device is designated as a presenting device when the at least a portion of the display screen is being shared; in response to determining that the first user device has not been designated as a receiving device for receiving a version of the video stream, generating a request to designate the first user device as a receiving device in addition to being a presenting device; and obtaining, based on images of the video stream, a preview stream of the at least a portion of the display screen for display at the first user device, the first user device simultaneously displaying both the at least a portion of the display screen and the preview stream while sharing the at least a portion of the display screen.

3. A method comprising: receiving a video stream of at least a portion of a display screen of a first user device; in response to determining that the first user device has not been designated as a receiving device, generating a request to designate the first user device as a receiving device; and obtaining, based on images of the video stream, a preview stream of the at least a portion of the display screen for display at the first user device, the first user device simultaneously displaying both the at least a portion of the display screen and the preview stream while sharing the at least a portion of the display screen.

4. A method comprising: receiving a video stream of at least a portion of a display screen of a first user device; and obtaining, based on images of the video stream, a preview stream of the at least a portion of the display screen for display at the first user device, the first user device simultaneously displaying both the at least a portion of the display screen and the preview stream while sharing the at least a portion of the display screen.

5. The method of any one of the preceding embodiments, wherein obtaining the preview stream of the at least a portion of the display screen for display at the first user device comprises: generating, at a server, based on the images of the video stream, the preview stream of the at least a portion of the display screen; and transmitting, from the server, to the first user device, the preview stream for display to a user.

6. The method of any one of the preceding embodiments, further comprising: reducing a frame rate or a resolution of the video stream of the at least a portion of the display screen to generate the preview stream.

7. The method of any one of the preceding embodiments, wherein obtaining the preview stream of the at least a portion of the display screen for display at the first user device comprises: generating, at the first user device, based on the images of the video stream, the preview stream for display to a user.

8. The method of any one of the preceding embodiments, further comprising: determining that the preview stream does not match the video stream being transmitted to a second user device; and in response to the determining, generating a notification for display to a user.

9. The method of any one of the preceding embodiments, wherein determining that the preview stream does not match the video stream being transmitted to the second user device comprises: receiving, from a server, the video stream being transmitted to the second user device; comparing one or more time-stamped images from the preview stream and the video stream; and determining that the preview stream does not match the video stream based on the comparison.

10. The method of any one of the preceding embodiments, further comprising: determining that an upload bandwidth of the first user device does not satisfy a threshold; and in response to the determining, generating for display to the user an option to turn off transmitting a video stream of the user from a camera of the first user device.

11. The method of any one of the preceding embodiments, further comprising: determining that the at least a portion of the display screen included in the preview stream does not match a current portion of the display screen a user is focusing on using an input device; and in response to the determining, generating a notification for display to the user.

12. The method of any one of the preceding embodiments, wherein generating the notification for display to the user comprises: generating for display to the user an option to switch sharing to the current portion of the display screen where the user is focusing on using the input device.

13. A tangible, non-transitory, machine-readable medium storing instructions that, when executed by a data processing apparatus, cause the data processing apparatus to perform operations comprising those of any of embodiments 1-12.

14. A system comprising: one or more processors; and memory storing instructions that, when executed by the processors, cause the processors to effectuate operations comprising those of any of embodiments 1-12.

15. A system comprising means for performing any of embodiments 1-12.

What is claimed is:

1. A server for a video conferencing service configured to send to a presenting user device, sharing a display screen to the video conferencing service, a server-side-generated preview stream based on a video stream of the display screen received at the server, the server comprising:
one or more processors; and
a non-transitory, computer-readable medium comprising instructions that, when executed by the one or more processors, cause operations comprising:
receiving, from a presenting user device connected to a video conferencing service, a video stream of a portion of a display screen being shared by a user of the video conferencing service;
receiving, from the presenting user device, an indication that the user has requested a preview stream of the portion of the display screen being shared by the user;
based on the indication, determining whether the presenting user device is designated as a screenshare receiving device for receiving a version of the video stream, wherein the presenting user device is designated as a presenting device when the portion of the display screen is being shared;
in response to determining that the presenting user device is not designated as a screenshare receiving device, generating a request to designate the presenting user device as a screenshare receiving device in addition to being a presenting device;
generating, based on images of the video stream from the presenting user device, the preview stream of the portion of the display screen being shared by the user; and
transmitting, to the presenting user device, the preview stream and one or more video streams of other users of the video conferencing service for display to the user, the presenting user device simultaneously displaying both the portion of the display screen and the preview stream while sharing the portion of the display screen.

2. The server of claim 1, wherein generating the preview stream of the portion of the display screen comprises:
reducing a frame rate and a resolution of the video stream of the portion of the display screen to generate the preview stream.

3. A method comprising:
receiving, from a first user device connected to a video conferencing service, a video stream of at least a portion of a display screen of the first user device;
determining whether the first user device has been designated as a receiving device for receiving a version of the video stream, wherein the first user device is designated as a presenting device when the at least a portion of the display screen is being shared;
in response to determining that the first user device has not been designated as a receiving device for receiving a version of the video stream, generating a request to designate the first user device as a receiving device in addition to being a presenting device; and
obtaining, based on images of the video stream, a preview stream of the at least a portion of the display screen for display at the first user device, the first user device simultaneously displaying both the at least a portion of the display screen and the preview stream while sharing the at least a portion of the display screen.

4. The method of claim 3, wherein obtaining the preview stream of the at least a portion of the display screen for display at the first user device comprises:
generating, at a server, based on the images of the video stream, the preview stream of the at least a portion of the display screen; and
transmitting, from the server, to the first user device, the preview stream for display to a user.

5. The method of claim 4, further comprising:
reducing a frame rate or a resolution of the video stream of the at least a portion of the display screen to generate the preview stream.

6. The method of claim 3, wherein obtaining the preview stream of the at least a portion of the display screen for display at the first user device comprises:
generating, at the first user device, based on the images of the video stream, the preview stream for display to a user.

7. The method of claim 3, further comprising:
determining that the preview stream does not match the video stream being transmitted to a second user device; and
in response to the determining, generating a notification for display to a user.

8. The method of claim 7, wherein determining that the preview stream does not match the video stream being transmitted to the second user device comprises:
receiving, from a server, the video stream being transmitted to the second user device;
comparing one or more time-stamped images from the preview stream and the video stream; and
determining that the preview stream does not match the video stream based on the comparison.

9. The method of claim 7, further comprising:
determining that an upload bandwidth of the first user device does not satisfy a threshold; and
in response to the determining, generating for display to the user an option to turn off transmitting a video stream of the user from a camera of the first user device.

10. The method of claim 3, further comprising:
determining that the at least a portion of the display screen included in the preview stream does not match a current portion of the display screen where a user is focusing, using an input device; and
in response to the determining, generating a notification for display to the user.

11. The method of claim 10, wherein generating the notification for display to the user comprises:
generating for display to the user an option to switch sharing to the current portion of the display screen where the user is focusing, using the input device.

12. A non-transitory, computer-readable medium comprising instructions that, when executed by one or more processors, cause operations comprising:
receiving a video stream of at least a portion of a display screen of a first user device;
in response to determining that the first user device has not been designated as a receiving device, generating a request to designate the first user device as a receiving device; and
obtaining, based on images of the video stream, a preview stream of the at least a portion of the display screen for display at the first user device, the first user device simultaneously displaying both the at least a portion of the display screen and the preview stream while sharing the at least a portion of the display screen.

13. The non-transitory, computer-readable medium of claim 12, wherein obtaining the preview stream of the at least a portion of the display screen for display at the first user device comprises:
generating, at a server, based on the images of the video stream, the preview stream of the at least a portion of the display screen; and
transmitting, from the server, to the first user device, the preview stream for display to a user.

14. The non-transitory, computer-readable medium of claim 13, wherein the instructions further cause operations comprising:
reducing a frame rate or a resolution of the video stream of the at least a portion of the display screen to generate the preview stream.

15. The non-transitory, computer-readable medium of claim 12, wherein obtaining the preview stream of the at least a portion of the display screen for display at the first user device comprises:
generating, at the first user device, based on the images of the video stream, the preview stream for display to a user.

16. The non-transitory, computer-readable medium of claim 12, wherein the instructions further cause operations comprising:
determining that the preview stream does not match the video stream being transmitted to a second user device; and
in response to the determining, generating a notification for display to a user.

17. The non-transitory, computer-readable medium of claim 16, wherein determining that the preview stream does not match the video stream being transmitted to the second user device comprises:
receiving, from a server, the video stream being transmitted to the second user device;
comparing one or more time-stamped images from the preview stream and the video stream; and
determining that the preview stream does not match the video stream based on the comparison.

18. The non-transitory, computer-readable medium of claim 16, wherein the instructions further cause operations comprising:
determining that an upload bandwidth of the first user device does not satisfy a threshold; and
in response to the determining, generating for display to the user an option to turn off transmitting a video stream of the user from a camera of the first user device.

19. The non-transitory, computer-readable medium of claim 12, wherein the instructions further cause operations comprising:
determining that the at least a portion of the display screen included in the preview stream does not match a current portion of the display screen where a user is focusing, using an input device; and
in response to the determining, generating a notification for display to the user.

20. The non-transitory, computer-readable medium of claim 19, wherein generating the notification for display to the user comprises:
generating for display to the user an option to switch sharing to the current portion of the display screen where the user is focusing, using the input device.

* * * * *